United States Patent [19]

Raj

[11] Patent Number: 4,478,424
[45] Date of Patent: Oct. 23, 1984

[54] FERROFLUID SEAL APPARATUS AND METHOD

[75] Inventor: Kuldip Raj, Merrimack, N.H.

[73] Assignee: Ferrofluidics Corporation, Nashua, N.H.

[21] Appl. No.: 574,359

[22] Filed: Jan. 27, 1984

[51] Int. Cl.³ .......................... F16J 15/40; F16J 15/54
[52] U.S. Cl. .......................................... 277/80; 277/1; 277/135
[58] Field of Search ............... 277/1, 80, 135, DIG. 7; 308/10, 36.1, 187.1, 187.2; 384/133

[56] References Cited

U.S. PATENT DOCUMENTS

| 4,340,233 | 7/1982 | Yamamura et al. | 277/80 X |
| 4,380,356 | 4/1983 | Weghaupt | 384/133 |

FOREIGN PATENT DOCUMENTS

| 2034213 | 6/1980 | Fed. Rep. of Germany | 384/133 |
| 54-30347 | 6/1979 | Japan | 277/80 |
| 773351 | 10/1980 | U.S.S.R. | 277/80 |
| 889988 | 12/1981 | U.S.S.R. | 277/80 |
| 918612 | 4/1982 | U.S.S.R. | 277/80 |

Primary Examiner—Robert S. Ward
Attorney, Agent, or Firm—Richard P. Crowley

[57] ABSTRACT

A ferrofluid seal apparatus and method, which ferrofluid seal apparatus comprises at least one ferrofluid seal about the surface of a rotatable shaft, the ferrofluid retained in a sealing relationship by magnetic flux from the ends of two pole pieces which define a cavity therebetween, and an interstage gap between the two pole pieces, which seal apparatus provides, within the single O-ring ferrofluid seal, a plurality of three separate regions of different magnetic-flux density, each of the regions having a different pressure value, the ferrofluid O-ring seal defining a ferrofluid exclusion seal between a first and second environment and the cavity, whereby the ferrofluid O-ring seal permits gas pressures from the cavity and the region environments to be transferred, on variations in pressures.

20 Claims, 6 Drawing Figures

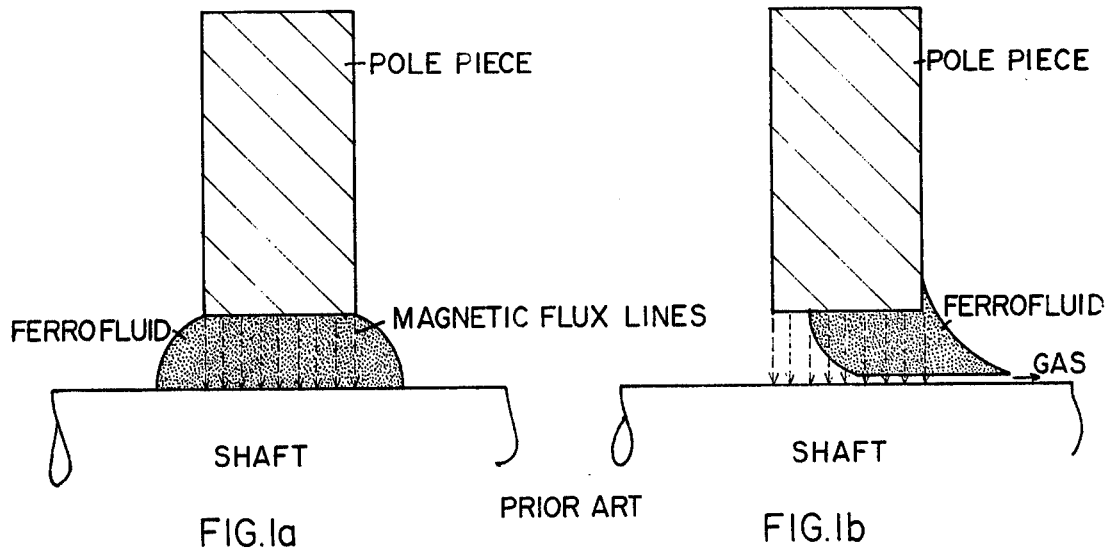
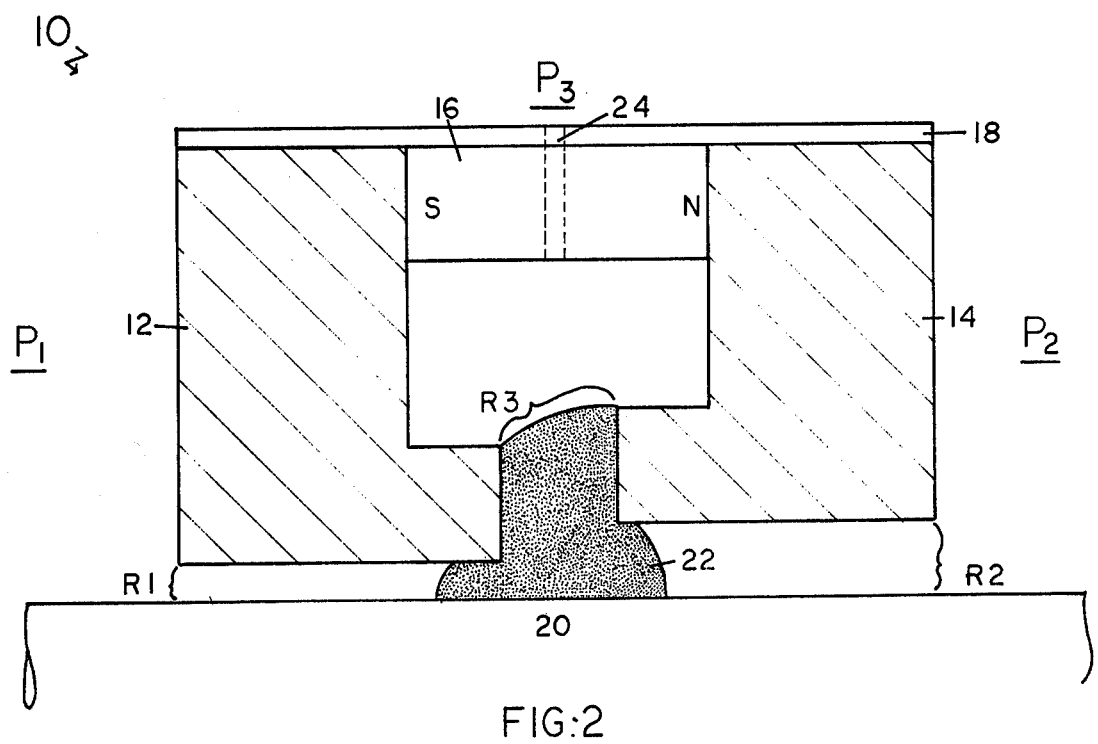

FERROFLUID SEAL APPARATUS AND METHOD

BACKGROUND OF THE INVENTION

Ferrofluid seal apparatuses and ferrofluid sealing methods are widely employed, to provide for both exclusion-type seals and pressure-capacity seals about a rotary shaft. Typically, an exclusion-type ferrofluid seal would comprise an annular permanent magnet and two separate pole pieces, one end of each pole piece extending into a close, noncontacting relationship with the surface of the shaft, to define a pair of radial gaps and to retain a ferrofluid O-ring seal by magnetic flux about the surface to the shaft under each of the radial gaps. Such a dual pole-piece ferrofluid seal apparatus typically has a closed, annular cavity between the respective pole pieces. Where a pressure-capacity-type ferrofluid seal apparatus is desired, a multiple-stage ferrofluid seal apparatus is employed, wherein there are multiple radial gaps, either formed on the ends of the pole pieces or formed on the shaft on the opposite ends of the pole pieces (see, for example, U.S. Pat. No. 3,620,584, issued Nov. 16, 1971).

Dual-stage ferrofluid seal apparatuses have been prepared, wherein the pole pieces are of different thickness, or wherein the radial gap between each end of the pole pieces has been varied, in order to provide for a ferrofluid seal apparatus of extended seal life, such as described in U.S. Pat. No. 4,357,021, issued Nov. 2, 1982. This patent describes a ferrofluid rotary-shaft seal apparatus of extended seal life, wherein one of the pole pieces has a varying radial-gap width caused by a tapered end on one pole piece, so that in operation the ferrofluid under the thinner pole piece evaporates first and forms an air gap into the air cavity between the pole pieces, while the ferrofluid, retained at the wider, tapered gap width, provides for extended ferrofluid exclusion seal life.

Also, ferrofluid rotary-shaft seal apparatuses of extended seal life have been described for use as an exclusion seal, particularly with computer-disc-drive spindles, wherein the seal apparatus comprises an annular permanent magnet and a pair of pole pieces, with the pole pieces generally of L-shaped configuration, to form a single ferrofluid O-ring seal about the surface of the shaft, as described, for example, in U.S. Pat. No. 4,357,024, issued Nov. 2, 1982. This patent describes L-shaped pole pieces of the same or different thicknesses, and wherein each of the pole pieces forms a uniform radial gap with the surface of the shaft element, and wherein extensions of the pole pieces extend toward each other, to form an interstage gap, so that the ferrofluid is retained within the interstage and the radial gaps, to form a single ferrofluid O-ring seal apparatus about the surface of the shaft element. The patent describes a single-stage ferrofluid exclusion-type seal, wherein the radial gaps between the ends of the L-shaped pole pieces are uniform; however, the interstage gap between the respective pole pieces may vary, in order to form the desired generally sectional, T-shaped ferrofluid seal.

It is desirable to provide for a ferrofluid exclusion or pressure-type seal which would provide exclusion or pressure protection between a first and second environment separated by the ferrofluid O-ring seal, and wherein any change in gas pressure in the respective environments may be transferred between such environments or to another or third region.

SUMMARY OF THE INVENTION

This invention relates to an improved ferrrofluid seal apparatus and method of sealing. In particular, the invention relates to a ferrofluid seal apparatus, wherein the ferrofluid seal is characterized by a plurality of different magnetic-flux densities within the ferrofluid seal, so as to permit the transfer of fluid between different regions, on pressure variations in the regions.

A ferrofluid seal apparatus and method have been discovered, which seal apparatus is effective in separating at least three different environments, and which ferrofluid seal apparatus and the ferrofluid stage therein act as a multiple, pressure-sensitive, two-way or multiple ferrofluid-type valve. It has been discovered that, by varying the radial and interstage gaps, and thus the magnetic-flux density on a single ferrofluid O-ring seal, the magnitude of the various radial interstage gaps will control the differential pressures and the direction of flow of gas between the environments separated by the ferrofluid seal, so that a single ferrofluid O-ring sealing ring may form at least three different pressure-type seals within the single ferrofluid ring. The ferrofluid seal apparatus of the invention may be employed as a ferrofluid exclusion seal with a single-stage ferrofluid seal having three or more different regions of different magnetic flux density and, thus, different pressure seals, or as a pressure-capacity-type ferrofluid seal, wherein a plurality of ferrofluid seals are employed with one or more of the ferrofluid seals, each having three or more different magnetic-flux regions, so as to act as a multi-connection ferrofluid valve operation, when employed to separate different environments.

The ferrofluid seal apparatus comprises an annular permanent magnet which is adapted to surround and surrounds a rotatable shaft element to be sealed, such as a magnetically permeable shaft element, which may be a computer-disc-drive spindle shaft or other shaft element. The apparatus includes at least first and second pole pieces, one end of each pole piece in a magnetic-flux relationship, and typically a contacting relationship, with the one and the other ends, respectively, of the permanent magnet, to define an enclosed air space or annular cavity between the pole pieces, with the other end of each of the pole pieces extending into a close, noncontacting relationship with the surface of the shaft element to be sealed, to define a first and second radial gap between the other ends of the pole pieces and the surface of the shaft. In addition, the pole pieces include an extension which may be formed through the use of L-shaped pole pieces, or by Y-shaped-type pole pieces, so as to form an interstage gap extending between the pole pieces. Ferrofluid is retained in the first and second radial gaps and in the interstage gap, to form a single, O-ring-type ferrofluid seal about the surface of the shaft and retained in position, by virtue of the magnetic flux from the annular permanent magnet. The ferrofluid seal apparatus may include one or a plurality of the single-stage ferrofluid O-ring seals.

In the ferrofluid seal apparatus of the invention, the dimensions of the first and second radial gaps and the interstage gap are varied. It has been found that the magnitudes of the various dimensions of the radial gaps control the differential pressures between the respective environments separated by the ferrofluid O-ring seal, and, therefore, by controlling the radial gaps and thus the magnetic-flux density within the single-stage ferrofluid O-ring seal, the direction of the flow of gases between the regions may be controlled, so that the ferrofluid seal acts, in fact, as a two- or multiple-way ferrofluid valve. The first and second radial gaps and the interstage gap distances are selected, with at least one of the radial gaps being different from the other radial gap. The radial and interstage gaps may vary in dimensions, depending on the particular design of the ferrofluid seal, but generally the gaps vary from 0.5 mils to 20 mils or more, and typically from 1 to 12 mils; for example, 1 to 6 mils. The dimensions of the radial gaps control the pressure of the ferrofluid seal between the respective region on one side of the ferrofluid O-ring seal and the region on the opposite side of the ferrofluid seal and the region within the cavity between the respective pole pieces. Thus, the selection of the dimensions of the radial gaps controls the magnetic-flux density areas of the seal and the pressure values to be sustained in each of the three regions. A gas in one region may communicate with another region, depending on the design parameters selected for the ferrofluid seal apparatus, while similarly gas pressures in the seal-separated regions can be transferred to the other region. It is also possible for one region to communicate simultaneously with the remaining two regions.

A multiconnection-type ferrofluid seal apparatus, having a pressure capacity, can be obtained by the stacking of the ferrofluid seal apparatus and altering the design parameters of the radial gaps and interstage gap, to provide a series of multiple-way ferrofluid valves separating the respective regions separated by the ferrofluid multicomponent ferrofluid seal apparatus. The geometries of the pole pieces may vary, as well as the sizes of the radial gaps and the choice of the magnetic material, and the ferrofluid all together can determine the various pressure capacities of the multiconnection ferrofluid seal apparatus and the direction of flow of the gas from one region to the other. Thus, the ferrofluid seal apparatus may be an exclusion seal or a pressure-capacity-type ferrofluid seal separating a first and a second environment, and permitting the first and second environments to communicate with each other, or with one or more annular cavities formed between the respective pole pieces in the ferrofluid seal apparatus. The ferrofluid seal apparatus of the invention has particular applications in the use of such seal apparatuses for pneumatic controls, robotics and in the chemical industry for the separating, mixing and transferring of gases between respective regions.

The ferrofluid exclusion seal apparatus may be used for sealing and separating various environments at the same or different pressures, such as, for example, an atmospheric air pressure from a subatmospheric or superatmospheric environment, or to separate reactive contamination-type or corrosive gases on one or both sides of the environment, and typically is employed as a pressure-capacity or ferrofluid exclusion seal, wherein the pressures are in the same or substantially the same region environment; however, the ferrofluid seal apparatus prevents any contamination of one region or environment, in the event that the ferrofluid exclusion seal bursts by excessive pressure, so as to direct the escaped gases into, for example, the cavity between the pole pieces, where it may be dissipated, such as through a passageway which extends into the cavity space between the pole pieces; thus serving as a safety-valve function for the ferrofluid seal apparatus.

The ferrofluid employed in the ferrofluid seal apparatus may vary in composition, and typically would comprise a low-volatility hydrocarbon or ester-type or other ferrofluid composition, typically ranging from 100 to 2000 cps in viscosity, such as 200 to 600, and typically is employed in shafts up to 2 inches and having speeds up to 5000 rpm, and with the ferrofluid composition having from 200 to 1000 gauss magnetic strength, such as 300 to 600 gauss. The ferrofluid seal apparatus of the invention may employ a variety of permanent-magnet materials, either of the molded plastic or elastomeric type, such as Plastiform magnetic material, or a samarium cobalt magnet or other type permanent magnets. An electromagnetic magnet also may be used, to provide a source of magnetic flux. The use of an electromagnetic magnet may be employed, by varying the current through the magnet, and thereby to vary the pressure capacity of the ferrofluid seal apparatus and the various stages as desired.

The invention comprises a method of sealing a shaft surface, particularly a rotary-shaft surface, with a ferrofluid O-ring seal, which method comprises forming one or more O-ring ferrofluid seals about the surface of the shaft, with the ferrofluid retained in a sealing relationship about the shaft by magnetic flux from a magnetic-source means, which is directed to pole pieces, and to define an O-ring ferrofluid seal, and which pole pieces form a cavity between the pole pieces, so that the pole pieces represent first and second radial gaps of different dimensions and an interstage gap of varying dimensions, and providing within the ferrofluid seal at least three different regions of varying flux density in each respective region of the single ferrofluid seal, whereby the ferrofluid may be altered in a multiple-valve fashion, to provide and to direct the flow of gases between the regions on either side of the exclusion seal and the cavity between the pole pieces, to function as a two-way or a multiconnection, ferrofluid-type valve in the seal apparatus.

The invention will be described for the purpose of illustration only in connection with certain embodiments; however, it is recognized that various changes, modifications and improvements may be made by those persons skilled in the art, all falling within the spirit and scope of the invention.

BRIEF DESCRIPTION OF THE DRAWINGS

FIGS. 1 (a) and (b) are general schematic illustrations of a portion of a ferrofluid seal of the prior art;

FIG. 2 is a schematic, sectional illustration of a ferrofluid seal apparatus of the invention;

DESCRIPTION OF THE EMBODIMENTS

Figure 3A:
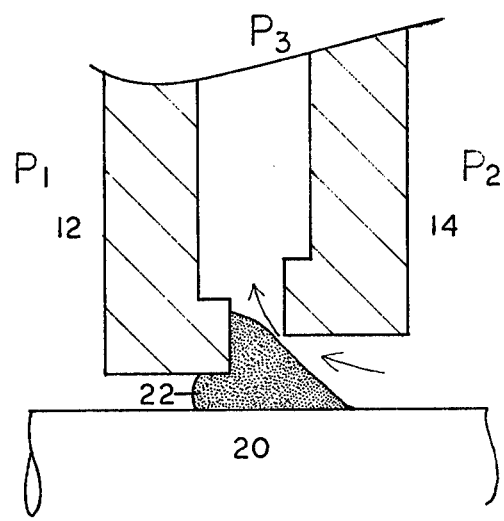
FIGS. 3 (a) and (b) are enlarged, fragmentary, illustrative views of a portion of the ferrofluid seal apparatus of FIG. 2, illustrating the seal acting as a ferrofluid valve.

FIG. 1 (a) is a general schematic representation of a prior-art ferrofluid seal, showing a pole piece with ferrofluid retained beneath one end of the pole piece and showing by dotted lines the magnetic-flux lines passing from the end of the pole piece into the underlying shaft, the ferrofluid seal assuming a general dome-like shape, as in a typical ferrofluid exclusion seal, which has a pressure capacity of about 3 to 5 psi. In FIG. 1 (a), the pressure on either side of the pole pieces is the same or substantially equal; that is, it does not exceed the bursting pressure of the ferrofluid seal apparatus. FIG. 1 (b) illustrates the bursting of the ferrofluid exclusion seal of FIG. 1 (a), when the pressure on the left-hand side of the pole piece exceeds the pressure of the ferrofluid exclusion seal, so that the normal shape of the ferrofluid beneath the one end of the pole piece, representing a single stage of a completed magnetic surface, is altered by the pressure that retains the ferrofluid in the radial gap under the one end of the pole piece. As illustrated, a small opening appears beneath the ferrofluid and the surface of the shaft, to allow the high-pressure gas, such as air, on the left-hand side of the pole piece to burst or bleed, until the pressure on the left-hand side is below the critical value for the exclusion seal. Thus, the ferrofluid seal apparatus, as illustrated in FIGS. 1 (a) and (b), may be considered as a ferrofluid-type valve which opens at a defined differential pressure and illustrates a one-way, prior-art, ferrofluid-type seal operation.

FIG. 2 is a schematic illustration of a two-way ferrofluid seal apparatus of the invention which acts as a two-way ferrofluid valve. The ferrofluid seal apparatus 10 comprises L-shaped, annular pole pieces 12 and 14 and an annular permanent magnet 16, the pole pieces 12 and 14 and the magnet 16 within a nonmagnetic housing 18, and the pole pieces 12 and 14 defining therebetween an air cavity, and the housing 18 and permanent magnet 16 containing a small hole or passageway radially drilled through the magnet and housing into the cavity. A magnetically permeable rotating shaft 20 is adjacent the ends of the pole pieces 12 and 14, and a ferrofluid 22 is captured at the ends of the pole pieces 12 and 14 and in the interstage region between the extensions or projections of the pole pieces 12 and 14. As illustrated, the ferrofluid seal apparatus is a quarter-sectional view of a ferrofluid seal surrounding a shaft 20. The ferrofluid seal apparatus 10 is employed as an exclusion seal, with a single-stage ferrofluid 22 retained as a ferrofluid O-ring about the surface of the shaft through the magnetic flux from the permanent magnet 16, with the flux in the radial gaps designated as $R_1$ and $R_2$ and the interstage gap as $R_3$. The ferrofluid seal apparatus 10 separates the first environment or region, having a pressure $P_1$, and a second environment or region, having a pressure $P_2$, while the air cavity between the pole pieces 12 and 14 through passageway 24 is connected to a third environment or region having a pressure $P_3$. The pressures $P_1$, $P_2$ and $P_3$ may be the same or different, and, in the operation of the ferrofluid seal apparatus, the ferrofluid seal may separate regions containing the same or different gases.

The ferrofluid seal apparatus 10 illustrates a two-way ferrofluid valve, with the radial gaps $R_1$ and $R_2$ and the interstage gap $R_3$ controlling the pressure values $P_1$, $P_2$ and $P_3$ which can be sustained in the three separate regions. Gas, such as air, in region $R_1$, having a pressure $P_1$, may communicate with region $R_2$ or $R_3$, depending upon the design parameters of the seal, or similarly gas pressure in regions $R_2$ or $R_3$ can be transferred to the remaining regions. If desired, the passageway 24 merely may connect to the atmospheric or to a subatmospheric pressure or to a pressure pump or to a different environment. In general, passageway 24 will merely discharge to the atmosphere, so that the ferrofluid seal apparatus 10 acts as a two-way ferrofluid-valve apparatus which provides additional protection against bursting of the seal and contamination of region $P_1$ or $P_2$. In the event that the pressure on one side, such as, for example, on the region one side or the left-hand side of the valve, momentarily exceeds the design gas pressure, then the valve may be designed, so that the gas under region $R_1$ will be discharged to the air cavity and through passageway 24 into the atmosphere, and, when the pressure is dissipated, the ferrofluid seal valve will then return to the normal valve position shown in FIG. 2. For illustrative purposes, the radial gap $R_2$ is greater than the radial gap $R_1$, while the radial gap $R_3$ is greater than both $R_1$ and $R_2$; thus directing any excess pressure froms regions $R_1$ or $R_2$ into region $R_3$.

For the purpose of illustration only, for example, $R_1$ may be 2 mils, $R_2$ 5 mils and $R_3$ 8 mils, and with the pressure $P_1$ being 3 to 4 psi, $P_2$ being 2 to 3 psi and $P_3$ being 1 to 2 psi. In another illustration, $R_1$ may be 1 mil, $R_2$ 2 mils and $R_3$ 5 mils, with $P_1$ being 6 psi, $P_2$ being 3 to 4 psi and $P_3$ being 4 psi. The radial gaps $R_1$ and $R_2$ should not be the same, but should differ, so as to provide a two-way valve, while the interstage gap $R_3$ may be the same as $R_1$ or $R_2$ or different.

Figure 3B:
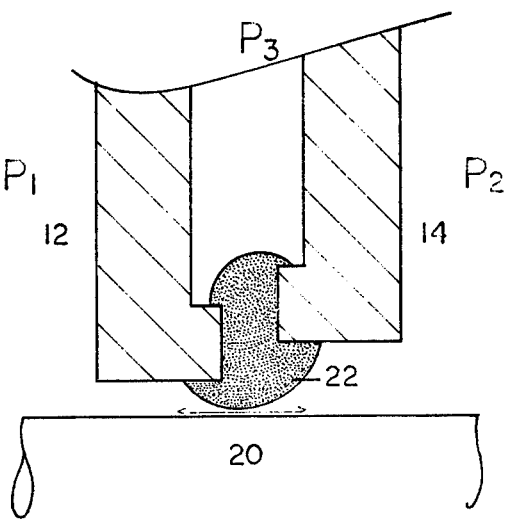

FIGS. 3 (a) and (b) are enlarged, fragmentary, schematic illustrations of the operation of the ferrofluid seal apparatus 10 of FIG. 2, with FIG. 3 (a) illustrating a condition wherein the pressure $P_2$ in region $R_2$ exceeds the pressure of $P_3$ in the air cavity, but not pressure $P_1$ in region $R_1$, so that the shape of the ferrofluid seal is altered, so as to permit the passage of gas in region $R_2$ under pressure $P_2$ into the air cavity and through the passageway 24 to region $R_3$. Of course, the opposite gas flow can occur; that is, by designing the valve to cause the flow of gases to move from region $R_1$ to region $R_2$ or $R_3$. FIG. 3 (b) is a further enlarged, fragmentary, schematic illustration, wherein the ferrofluid seal apparatus 10 acts as a two-way valve, and wherein gas flow is permitted between regions $R_1$ and $R_2$, but gas flow is denied into region $R_3$, by making the interstage radial gap $R_3$ less than the radial gaps of $R_1$ and $R_2$.

Figure 4:
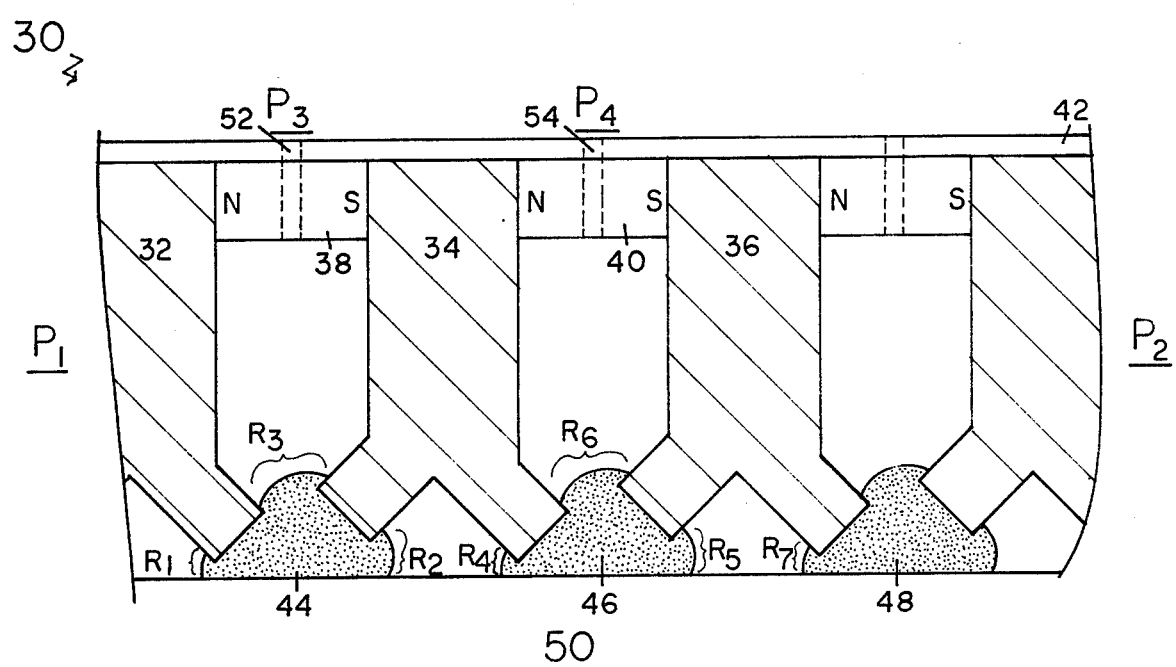
FIG. 4 is a schematic, sectional illustration of a multiconnection ferrofluid seal apparatus of the invention.

FIG. 4 is a schematic illustration of a multiconnection ferrofluid seal apparatus 30 of the invention comprising a plurality of pole pieces 32, 34 and 36, with intervening permanent magnets 38 and 40, all contained within a nonmagnetic housing 42, and adapted to surround a shaft 50, and with ferrofluid 44, 46 and 48 retained as separate, spaced-apart O-ring ferrofluid seals at the end of each of the pole pieces, and with a passageway 52 and 54 into the intervening air cavity between the pole pieces and defining the passageway to region $R_3$, while the valve shown is separating a region $R_1$ on the left-hand side at $P_1$ and a region $R_2$ at $P_2$ on the right-hand side. The multiconnection seal apparatus of FIG. 4 is obtained by stacking together a number of individual ferrofluid seal apparatuses of the invention, such as the apparatus of FIG. 2. The pole-piece geometries, the size of the radial gaps and the choice of the permanent-magnet materials may vary, to determine the pressure capacities and the direction of flow of the gas as desired. The arrangement shown in the multiconnection ferrofluid valve seal apparatus 30 allows six separate regions to be connected or, when adding more individual seals, other regions can be created as required. The radial gaps between the ends of the pole pieces may vary as the interstage gaps, as illustrated, and provide for opening and closing of the ferrofluid between the respective regions and to direct the flow of gas as required. The multiconnection ferrofluid seal apparatus has particular usefulness as a fast-operating, multiconnection valve, in that various pressures may be used in pressures $P_3$, $P_4$, etc., to open or close the ferrofluid seal and to direct the flow of gases between regions $R_1$ and $R_2$ or into any intermediate regions, by varying the pressures in the respective cavities.

What is claimed is:

1. A ferrofluid seal apparatus which comprises:
   (a) a magnet means adapted to surround a shaft element to be sealed and to provide poles of opposite polarity;
   (b) first and second pole pieces, each having a one and another end, one end of each pole piece in a magnetic-flux relationship with the one and the other ends, respectively, of the magnetic means, the other end of each pole piece extending into a noncontacting relationship with the surface of the shaft element, to define a first and a second radial gap, the first and second radial gaps having different dimensions, the first and second pole pieces having projections which extend toward each other, to define an interstage gap and an annular cavity therebetween, the interstage gap having a dimension different from the first or second radial gap;
   (c) ferrofluid retained in the first and second radial gaps and the interstage gap, by the magnetic flux of the magnetic means, to form a single O-ring ferrofluid seal about the surface of the shaft element which separates a first region on one side and a second region on the other side of the ferrofluid seal;
   (d) a passageway means extending into the annular cavity and to a third region; and
   (e) the single ferrofluid seal having therein three or more areas of different magnetic-flux density, whereby, subject to the pressure in each of the said regions, the ferrofluid seal acts as a two-way ferrofluid valve which controls the flow of gas between the said regions.

2. The apparatus of claim 1 wherein the dimensions of the first and second radial gaps and the interstage gap range from about 0.5 to 12 mils.

3. The apparatus of claim 1 wherein the first or second radial gap has a dimension of 1 to 3 mils and the interstage gap has a dimension greater than 1 to 3 mils.

4. The apparatus of claim 1 wherein the magnetic means comprises an annular permanent magnet.

5. The apparatus of claim 1 which includes a magnetically permeable shaft element.

6. The apparatus of claim 1 wherein the first and second pole pieces have a generally L-shaped, sectional configuration.

7. The apparatus of claim 1 wherein region one or two is at subatmospheric pressure and the other region is at atmospheric pressure.

8. The apparatus of claim 1 wherein region three is at atmospheric pressure.

9. The apparatus of claim 1 wherein the ferrofluid is a low-volatility hydrocarbon or ester ferrofluid having a viscosity of 100 to 2000 cps and a gauss value of 100 to 1000.

10. The multiple-stage ferrofluid seal apparatus which comprises a stacked plurality of seal apparatuses of claim 1, to provide a series of spaced-apart ferrofluid seals about the surface of the shaft element, to provide a multiple-stage multiple-valve-type ferrofluid seal.

11. The seal apparatus of claim 10 wherein the pole pieces include a plurality of generally inverted, Y-shaped pole pieces.

12. A ferrofluid seal apparatus which comprises:
   (a) a magnet means which comprises an annular permanent magnet and adapted to surround a shaft element to be sealed and to provide poles of opposite polarity;
   (b) first and second pole pieces having a generally L-shaped, sectional configuration, each having a one and another end, one end of each pole piece in a magnetic-flux relationship with the one and the other ends, respectively, of the magnetic means, the other end of each pole piece extending into a noncontacting relationship with the surface of the shaft element, to define a first and a second radial gap, the first and second radial gaps having different dimensions, the first and second pole pieces having projections which extend toward each other, to define an interstage gap and an annular cavity therebetween, the interstage gap having a dimension different from the first or second radial gap, wherein the dimensions of the first and second radial gaps and the interstage gap range from about 0.5 to 12 mils;
   (c) ferrofluid retained in the first and second radial gaps and the interstage gap, by the magnetic flux of the magnetic means, to form a single O-ring ferrofluid seal about the surface of the shaft element which separates a first region on one side and a second region on the other side of the ferrofluid seal;
   (d) a passageway means extending into the annular cavity and to a third region; and
   (e) the single ferrofluid seal having therein three or more areas of different magnetic-flux density, whereby, subject to the pressure in each of the said regions, the ferrofluid seal acts as a two-way ferrofluid valve which controls the flow of gas between the said regions.

13. A method of sealing a shaft element, to provide a ferrofluid seal and multiple-ferrofluid valve, which method comprises:
   (a) forming a single ferrofluid seal about the surface of a shaft element, which seal separates a first region on one side and a second region on the other side of the ferrofluid seal;
   (b) forming an annular cavity above the ferrofluid seal, which cavity contains a passageway which extends to a third region; and
   (c) providing within the single ferrofluid seal areas of at least three different magnetic-flux densities,
whereby the ferrofluid seal opens and closes to the respective regions, based on the design pressure capacity of the ferrofluid seal.

14. The method of claim 13 wherein the ferrofluid seal is formed between the ends of a pair of L-shaped pole pieces, and the annular cavity is formed between the pole pieces.

15. The method of claim 14 which includes forming the different magnetic-flux-density areas in the ferrofluid seal, by retaining the ferrofluid seal about the surface of the shaft element between the ends of two pole pieces, the seal retained by three gaps of different dimensions.

16. The method of claim 13 which includes maintaining a difference in magnetic-flux density, so that, on an increase in gas pressure in region one or two, the ferrofluid seal permits the flow of gas into the annular cavity.

17. The method of claim 13 which includes maintaining a difference in magnetic-flux density, so that an increase in gas pressure in region one or two permits the flow of gas between regions one and two.

18. The method of claim 13 which includes arranging a plurality of spaced-apart, O-ring ferrofluid seals about the surface of the shaft element, to define a multiconnection ferrofluid seal and valve, to control the flow of gas between the first or second region or any intervening third region.

19. The method of claim 13 which includes maintaining a difference in the magnetic-flux-density areas in the ferrofluid seal, by the use of first and second radial gaps and an interstage gap having different dimensions and ranging from about 1 to 12 mils.

20. The method of claim 13 which includes maintaining one of the regions at a subatmospheric or above-atmospheric pressure and one region at atmospheric pressure, to permit flow between the regions by movement of the ferrofluid seal on excess pressure in one region.

* * * * *